(12) United States Patent
Chandra et al.

(10) Patent No.: US 12,515,319 B2
(45) Date of Patent: Jan. 6, 2026

(54) SYSTEMS AND METHODS FOR CONTROLLING A ROBOTIC MANIPULATOR OR ASSOCIATED TOOL

(71) Applicant: Intuitive Surgical Operations, Inc., Sunnyvale, CA (US)

(72) Inventors: Ramu Sharat Chandra, San Jose, CA (US); Goran A. Lynch, Oakland, CA (US)

(73) Assignee: INTUITIVE SURGICAL OPERATIONS, INC., Sunnyvale, CA (US)

( * ) Notice: Subject to any disclaimer, the term of this patent is extended or adjusted under 35 U.S.C. 154(b) by 160 days.

(21) Appl. No.: 18/553,387

(22) PCT Filed: Mar. 30, 2022

(86) PCT No.: PCT/US2022/022574
§ 371 (c)(1),
(2) Date: Sep. 29, 2023

(87) PCT Pub. No.: WO2022/212524
PCT Pub. Date: Oct. 6, 2022

(65) Prior Publication Data
US 2024/0173856 A1 May 30, 2024

Related U.S. Application Data

(60) Provisional application No. 63/169,443, filed on Apr. 1, 2021.

(51) Int. Cl.
*B25J 9/16* (2006.01)
*A61B 34/00* (2016.01)
(Continued)

(52) U.S. Cl.
CPC ............. *B25J 9/1628* (2013.01); *A61B 34/30* (2016.02); *A61B 34/77* (2016.02); *G05B 19/4155* (2013.01); *G05B 2219/40269* (2013.01)

(58) Field of Classification Search
CPC ...... B25J 9/163; B25J 9/1633; G05B 13/0265
See application file for complete search history.

(56) References Cited

U.S. PATENT DOCUMENTS

| 2006/0265120 A1 | 11/2006 | Coleman et al. |
| 2007/0057842 A1 | 3/2007 | Coleman et al. |

(Continued)

FOREIGN PATENT DOCUMENTS

| EP | 1795313 A2 | 6/2007 |
| EP | 2759382 A2 | 7/2014 |
| WO | WO-2019094794 A2 | 5/2019 |

OTHER PUBLICATIONS

International Preliminary Report on Patentability for Application No. PCT/US2022/022574 mailed Oct. 12, 2023, 09 pages.

(Continued)

*Primary Examiner* — Dylan M Katz
(74) *Attorney, Agent, or Firm* — Haynes & Boone, LLP.

(57) ABSTRACT

A robotic system includes a robotic manipulator, which includes a first joint and a link connected to the first joint. A processing unit including one or more processors is configured to receive sensor measurement data of the link from a sensor system, and generate, based on the sensor measurement data, a first joint velocity estimate of the first joint. A first vibration cancellation state for the first joint is determined based on one or more cancellation conditions of one or more of joints of the robotic manipulator. In response to the first vibration cancellation state indicating enablement of vibration cancellation for the first joint, a first cancellation (Continued)

force is applied to the first joint, the first cancellation force based on a first joint velocity estimate of the first joint.

20 Claims, 7 Drawing Sheets (51) Int. Cl.
*A61B 34/30* (2016.01)
*G05B 19/4155* (2006.01)

(56) References Cited

U.S. PATENT DOCUMENTS

| | | | |
|---|---|---|---|
| 2007/0152619 A1* | 7/2007 | Sugiyama | B25J 9/1612 700/245 |
| 2016/0301845 A1 | 10/2016 | Bell et al. | |
| 2018/0132850 A1 | 5/2018 | Leimbach et al. | |
| 2019/0143506 A1 | 5/2019 | Rabindran et al. | |
| 2019/0143513 A1 | 5/2019 | Rabindran et al. | |

OTHER PUBLICATIONS

Axelsson P., et al., "H∞-Controller Design Methods Applied to One Joint of a Flexible Industrial Manipulator," 19th IFAC World Congress Cape Town, South Africa, Aug. 24-29, 2014, pp. 210-216.
Behi F., et al., "Parametric Identification for Industrial Manipulators Using Experimental Modal Analysis," IEEE Transactions on Robotics and Automation, vol. 7 (5), Oct. 1991, pp. 642-652.
Chen W., et al., "Direct Joint Space State Estimation in Robots with Multiple Elastic Joints," IEEE/ASME Transactions on Mechatronics, Apr. 2014, vol. 19 (2), pp. 697-706.
International Search Report and Written Opinion for Application No. PCT/US2022/022574, mailed Jul. 8, 2022, 14 pages.
Vertut, J., and Coiffet, P., "Robot Technology: Teleoperation and Robotics Evolution and Development," English translation, Prentice-Hall, Inc., Inglewood Cliffs, NJ, USA 1986, vol. 3A, 332 pages.
Vikas V., et al., "Joint Angle Measurement Using Strategically Placed Accelerometers and Gyroscope," Journal of Mechanisms and Robotics, Transactions of the ASME, vol. 8, May 2016, pp. 021003-1-021003-7.

* cited by examiner

SYSTEMS AND METHODS FOR CONTROLLING A ROBOTIC MANIPULATOR OR ASSOCIATED TOOL

CROSS-REFERENCE TO RELATED APPLICATIONS

This application is the U.S. national phase of International Application No. PCT/US2022/022574, filed Mar. 30, 2022, which designated the U.S. and claims the benefit of U.S. Provisional Patent Application 63/169,443, entitled "SYSTEMS AND METHODS FOR CONTROLLING A ROBOTIC MANIPULATOR OR ASSOCIATED TOOL," filed Apr. 1, 2021, all of which is are incorporated by reference herein in its their entirety.

FIELD

The present disclosure is directed to systems and methods for performing a robotic procedure, and more particularly to systems and methods for controlling a robotic manipulator or a tool associated with a robotic manipulator.

BACKGROUND

Robotic manipulator assemblies comprising one or more robotic manipulators can be operated to control motion of tools in workspaces. For example, such robotic manipulators can be used to perform non-medical and medical procedures. As a specific example, teleoperated manipulators can be used to perform minimally invasive medical procedures.

Robotic manipulators may be teleoperated or otherwise computer-assisted. For example, a tool may be held by a robotic manipulator assembly for performing a procedure. However, a robotic manipulator assembly and the tool may experience undesirable vibrations. Robotic manipulators with greater physical compliance (e.g. due to material properties, shapes of components, assembly methods, etc.) may be more prone to under-damped vibrations, vibrations having larger magnitudes, and the like. While performing a procedure, such vibrations may negatively affect system performance. For example, such vibrations may make it more difficult for the computer-assisted system to achieve or follow commanded trajectories for the tool.

Such vibrations may negatively affect control in all types of robotic systems, including industrial, recreational, and medical robotic systems. In a medical robotic example, such vibrations may make it more difficult for a medical robotic system to accurately perform the commanded manipulations of tissue, movement of imaging systems, insertion of needles, application of sutures, etc. For a further example, in some implementations, the robotic system is configured to pivot a tool about a remote center of motion (also referred to as "remote center") during part or all of a procedure. In some instances, the vibrations may cause the remote center of motion to move beyond a tolerance amount.

Thus, systems and methods are desired to provide better control of robotic systems and tools supported by the robotic systems, for example, by mitigating vibrations.

SUMMARY

The embodiments of the invention are summarized by the claims that follow below.

In some embodiments, a robotic system includes a robotic manipulator including a first joint and a link connected to the first joint; and a processing unit including one or more processors. The processing unit is configured to: receive sensor measurement data of the link from a sensor system; generate, based on the sensor measurement data, a first joint velocity estimate of the first joint; determine a first vibration cancellation state for the first joint based on one or more cancellation conditions of one or more of joints of the robotic manipulator; and in response to the first vibration cancellation state indicating enablement of vibration cancellation for the first joint, apply a first cancellation force to the first joint, the first cancellation force based on a first joint velocity estimate of the first joint.

In some embodiments, a method includes receiving, from a sensor system, sensor measurement data of a link of a robotic manipulator of a robotic system, wherein the robotic manipulator includes a first joint connected to the link; generating, based on the sensor measurement data, a first joint velocity estimate of the first joint; generating, based on the sensor measurement data, a first joint velocity estimate of the first joint; determining a first vibration cancellation state for the first joint based on one or more cancellation conditions of one or more of joints of the robotic manipulator; and in response to the first vibration cancellation state indicating enablement of vibration cancellation for the first joint, applying a first cancellation force to the first joint, the first cancellation force based on a first joint velocity estimate of the first joint.

In some embodiments, a non-transitory machine-readable medium comprising a plurality of machine-readable instructions which, when executed by one or more processors, are adapted to cause the one or more processors to perform a method. The method includes receiving, from a sensor system, sensor measurement data of a link of a robotic manipulator of a robotic system, wherein the robotic manipulator includes a first joint connected to the link; generating, based on the sensor measurement data, a first joint velocity estimate of the first joint; generating, based on the sensor measurement data, a first joint velocity estimate of the first joint; determining a first vibration cancellation state for the first joint based on one or more cancellation conditions of one or more of joints of the robotic manipulator; and in response to the first vibration cancellation state indicating enablement of vibration cancellation for the first joint, applying a first cancellation force to the first joint, the first cancellation force based on a first joint velocity estimate of the first joint.

It is to be understood that both the foregoing general description and the following detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following detailed description.

BRIEF DESCRIPTIONS OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion. In addition, the present disclosure may repeat reference numerals and/or letters in the various examples. This repetition is for the purpose of simplicity and clarity and does not in itself dictate a relationship between the various embodiments and/or configurations discussed.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. In the following detailed description of the aspects of the invention, numerous specific details are set forth in order to provide a thorough understanding of the disclosed embodiments. However, it will be obvious to one skilled in the art that the embodiments of this disclosure may be practiced without these specific details. In other instances, well-known methods, procedures, components, and circuits have not been described in detail so as to not unnecessarily obscure aspects of the embodiments of the invention.

Any alterations and further modifications to the described devices, tools, methods, and any further application of the principles of the present disclosure are fully contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. In addition, dimensions provided herein are for specific examples and it is contemplated that different sizes, dimensions, and/or ratios may be utilized to implement the concepts of the present disclosure. To avoid needless descriptive repetition, one or more components or actions described in accordance with one illustrative embodiment can be used or omitted as applicable from other illustrative embodiments. For the sake of brevity, the numerous iterations of these combinations will not be described separately. For simplicity, in some instances, the same reference numbers are used throughout the drawings to refer to the same or like parts.

The embodiments below will describe various tools and portions of tools in terms of their state in three-dimensional space. As used herein, the term "position" refers to the location of an object or a portion of an object in a three-dimensional space (e.g., three degrees of translational freedom that can be described using changes in Cartesian X, Y, Z coordinates, such as along Cartesian X, Y, Z axes). As used herein, the term "orientation" refers to the rotational placement of an object or a portion of an object (three degrees of rotational freedom—e.g., which can be described using roll, pitch, and yaw). As used herein, the term "pose" refers to the position of an object or a portion of an object in at least one degree of translational freedom, and to the orientation of that object or that portion of that object in at least one degree of rotational freedom. For an asymmetric, rigid body in a three-dimensional space, a full pose can be described with six total degrees of freedom.

Aspects of this disclosure are described in reference to computer-assisted systems and devices, which may include systems and devices that are teleoperated, remote-controlled, autonomous, semiautonomous, robotic, and/or the like. Further, although some of the examples described herein often refer to medical procedures and medical tools, the techniques disclosed also apply to non-medical procedures and non-medical tools. Robotic medical embodiments are merely exemplary and are not to be considered as limiting the scope of the inventive aspects disclosed herein. For example, techniques described with reference to surgical instruments and surgical methods may be used in other contexts. Thus, the instruments, systems, and methods described herein may be used for humans, animals, portions of human or animal anatomy, industrial systems, general robotic, or teleoperational systems. As further examples, the instruments, systems, and methods described herein may be used for non-medical purposes including industrial uses, general robotic uses, sensing or manipulating non-tissue work pieces, cosmetic improvements, imaging of human or animal anatomy, gathering data from human or animal anatomy, setting up or taking down systems, training medical or non-medical personnel, and/or the like. Additional example applications include use for procedures on tissue removed from human or animal anatomies (without return to a human or animal anatomy) and for procedures on human or animal cadavers. Further, these techniques can also be used for medical treatment or diagnosis procedures that include, or do not include, surgical aspects.

Figure 1:
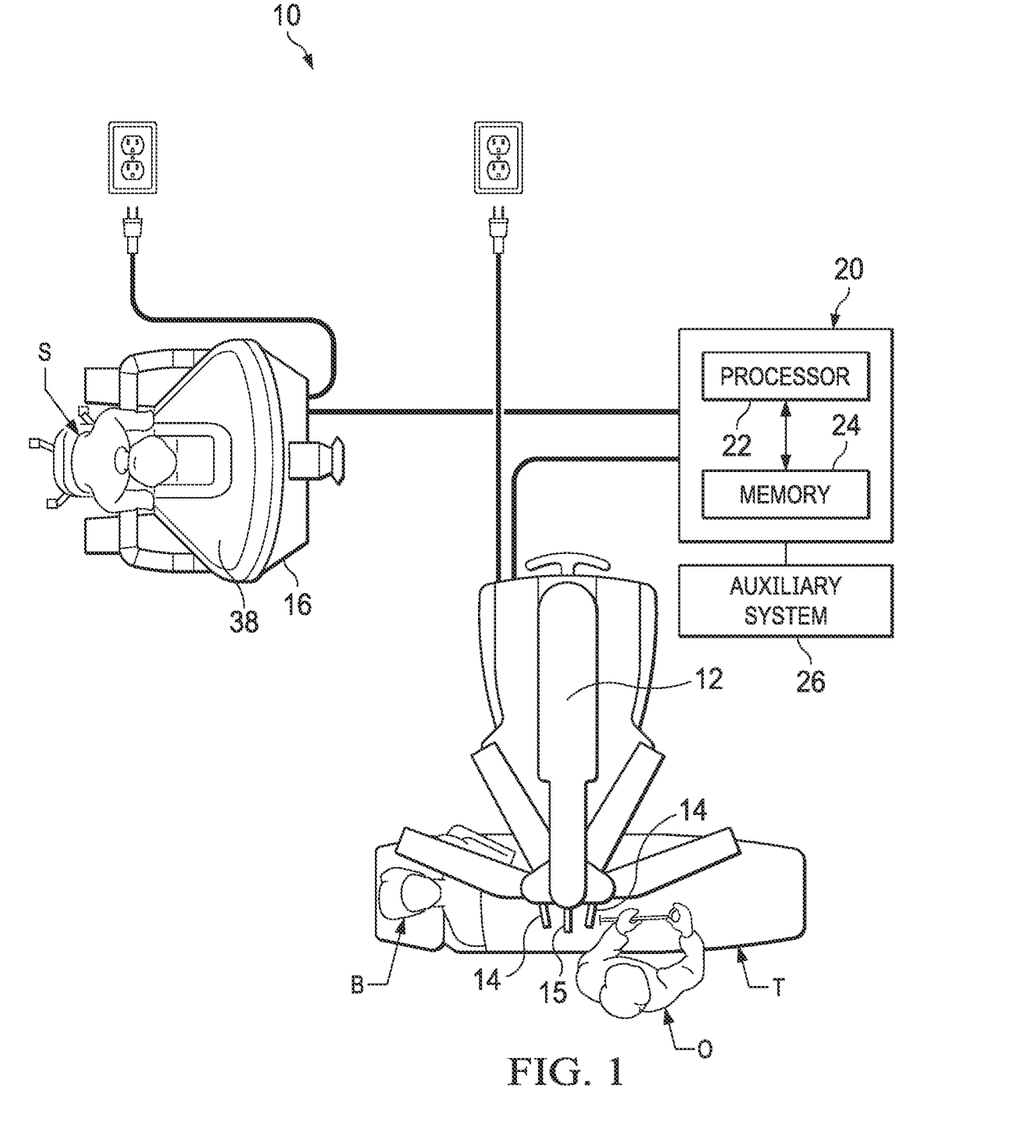
FIG. 1 is a schematic view of a robotic system, in accordance with an embodiment of the present disclosure.

Referring to FIG. 1, an example robotic system is shown. Specifically, in FIG. 1, a computer-aided, robotic system 10 that may be teleoperated is illustrated. System 10 may be used in, for example, medical procedures, including diagnostic or therapeutic procedures. In some embodiments, manipulators or other parts of a robotic system may be controlled directly through manual interaction with the manipulators (or the other parts) themselves. "Teleoperated manipulators" as used in this application include manipulators that can be controlled only through teleoperation, and manipulators that can be controlled partially through teleoperation (e.g. direct manual control may be possible for parts of manipulators, or at different times or in different modes from teleoperation). Further, in some embodiments, a robotic system may be under the partial control of a computer programmed to perform the procedure or sub-procedure. In still other alternative embodiments, a fully automated robotic system, under the full control of a computer programmed to perform the procedure or sub-procedure, may be used to perform procedures or sub-procedures.

As shown in FIG. 1, the robotic system 10 generally includes a manipulator assembly 12 mounted to or near table T on which a body B to which the manipulator assembly 12 is to perform a procedure is positioned (FIG. 1 shows the body B as a patient, for a medical example). The manipulator assemblies described herein often include one or more robotic manipulators and tools mounted thereon, although the term "manipulator assembly" is defined to also encompass the manipulator without the tool mounted thereon. A tool 14 and a tool 15 are shown operably coupled to the manipulator assembly 12. For convenience within this disclosure, the tool 15 includes an image sensor, and may also be referred to as the imaging tool 15 when it does include an imaging sensor. The imaging tool 15 may comprise an endoscope. The imaging sensor of the imaging tool 15 may be based on optical imaging technology, ultrasonic imaging technology, or other technology (e.g. fluoroscopic, etc.). An operator input system 16 allows an operator O to view images of or representing the procedure site and to control the operation of the tool 14 and/or the tool 15.

The operator input system 16 for the robotic system 10 may be "mechanically grounded" by being connected to a base with linkages such as to an operator's console, or it may be "mechanically ungrounded" and not be thus connected. In the example shown in FIG. 1A, the operator input system 16 is connected to an operator's console 38 that is usually located in the same room as table T during the procedure. It should be understood, however, that the operator O can be located in a different room or a completely different building from the body B. The operator input system 16 generally includes one or more control device(s) for controlling the tool 14. The one or more control devices are also referred to herein as "input devices."

The manipulator assembly 12 supports and manipulates the tool 14 while the operator O views the procedure site through the operator's console. An image of the procedure site can be obtained by the tool 15, such as in a medical example via an image sensor system comprising an endoscope. The number of tools 14 used at one time may vary with the procedure, the operator, the space constraints, and factors. The manipulator assembly 12 may include a kinematic structure of one or more non-servo controlled links (e.g., one or more links that may be manually positioned and locked in place) and a robotic manipulator. The manipulator assembly 12 includes a plurality of actuators of an actuation assembly that drive the tools 14. These actuators move in response to commands from the control system (e.g., control system 20). The actuators include drive systems which when coupled to the tools 14 may advance or retract the tools 14 through a body wall, move the distal end of the tools 14 in multiple degrees of freedom, or operate other functions of the tools 14 (e.g. applying energy, stapling, etc.). Movement of the tools 14 may include one, two, three or more degrees of translational freedom; one, two, three, or more degrees of rotational freedom; or other degrees of freedom (e.g. opening or closing jaws, movement of intermediate portions of the tools 14, etc.). In a medical example, the tools 14 may include end effectors each having a single working member such as a scalpel, a blunt blade, a needle, a suction irrigator, a endoscopic tip, an optical fiber, an electrode, and an electrocautery hook, or end effectors each having multiple working members, such as forceps, graspers, clip appliers, staplers, vessel sealers, electrocautery scissors, etc.

The robotic system 10 also includes a control system 20. The control system 20 includes at least one memory 24 and at least one processor 22, and typically a plurality of processors, for effecting control between the tool 14, the operator input system 16, and other auxiliary systems 26 which may include, for example, image sensor systems, audio systems, fluid delivery systems, display systems, illumination systems, steering control systems, irrigation systems, and/or suction systems. The one or more processors 22 of the control system 20 may be located in one location or located in different locations. In an example, the control system 20 may include a processor located in a manipulator assembly for processing image data from the image sensor systems. This option can also be covered, either here or wherever control system 20 is introduced. The control system 20 also includes programmed instructions (e.g., a computer-readable medium storing the instructions) to implement some or all of the methods described in accordance with aspects disclosed herein. While control system 20 is shown as a single block in the simplified schematic of FIG. 1B, the system may include two or more data processing circuits with one portion of the processing optionally being performed on or adjacent the manipulator assembly 12, another portion of the processing being performed at the operator input system 16, and the like. Any of a wide variety of centralized or distributed data processing architectures may be employed. Similarly, the programmed instructions may be implemented as a number of separate programs or subroutines, or they may be integrated into a number of other aspects of the teleoperational systems described herein. In one embodiment, control system 20 supports wireless communication protocols such as Bluetooth, IrDA, HomeRF, IEEE 802.11, DECT, and Wireless Telemetry.

In some embodiments, the control system 20 may include one or more servo controllers that receive force and/or torque feedback from the tool 14 or from the manipulator assembly 12. Responsive to the feedback, the servo controllers transmit signals to the operator input system 16. The servo controller(s) may also transmit signals that instruct the manipulator assembly 12 to move the tool(s) 14 and/or 15 which extends into an internal procedure site within the body via opening(s) in the body wall of the body. Any suitable conventional or specialized controller may be used. A controller may be separate from, or integrated with, manipulator assembly 12. In some medical embodiments, the controller and manipulator assembly are parts of an integrated system, such as a teleoperational manipulator cart positioned proximate to a patient's body during a medical procedure.

The control system 20 can be coupled to the tool 15 and can include a processor to process captured images for subsequent display, such as to an operator O using the operator's console or wearing a head-mounted display system, on one or more stationary or movable monitors near the control system, or on another suitable display located locally and/or remotely. For example, where a stereoscopic or depth-capable image sensor is used, the control system 20 can process the captured images to present the operator with coordinated stereo images of the procedure site. Such coordination can include alignment between the stereo images and can include adjusting the stereo working distance of the stereoscopic endoscope.

In alternative embodiments, the robotic system may include more than one manipulator assembly and/or more than one operator input system. The exact number of manipulator assemblies will depend on the surgical procedure and the space constraints within the operating room, among other factors. The operator input systems may be collocated, or they may be positioned in separate locations. Multiple operator input systems allow more than one operator to control one or more manipulator assemblies in various combinations.

Figure 2:
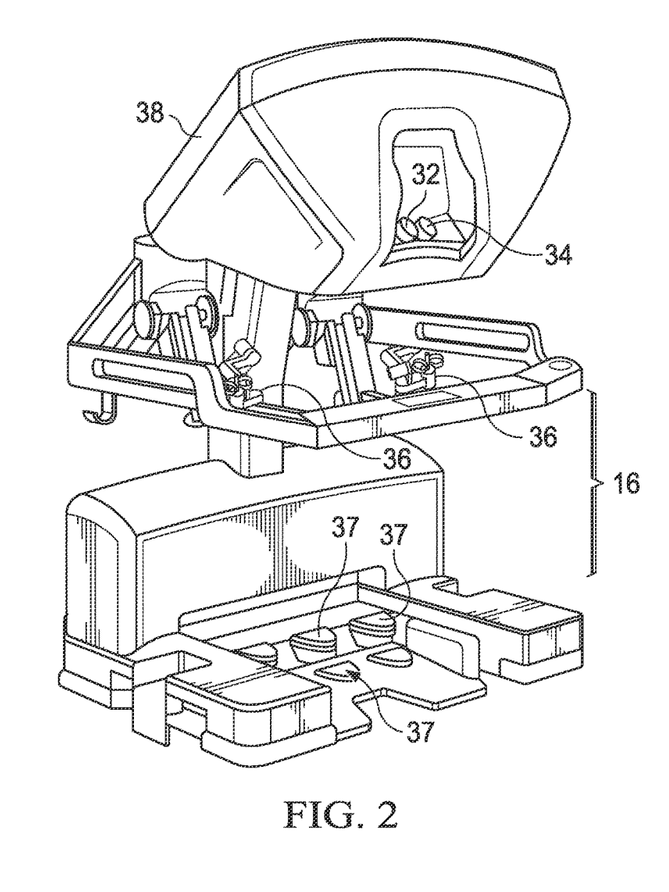
FIG. 2 is a perspective view of an operator's control console for a robotic system, in accordance with an embodiment of the present disclosure.

FIG. 2 is a perspective view of the operator's console 38. The operator's console 38 includes a left eye display 32 and a right eye display 34 for presenting the operator O with a coordinated stereo view of the operating environment. An operator input system 16 of the operator's console 38 includes one or more control devices 36, which in turn causes the manipulator assembly 12 to manipulate one or more tools 14 and/or 15. In a medical example, the control devices 36 may be used to operate tools 14 and/or 15 to, for example, move along translational or rotational degrees of freedom, close jawed end effectors, apply an electrical potential to an electrode, staple tissue, cut tissue, bend a joint along a shaft of a tool 14, 15, apply or suction fluid, or the like. In various alternatives, the control devices 36 may additionally or alternatively include one or more of a variety of input apparatuses, such as joystick devices, trackballs, data gloves, trigger-guns, voice recognition devices, touch screens, foot pedals, body motion sensors, presence sensors, and/or the like. In various embodiments, the control device (s) will be provided with more, fewer, or the same degrees of freedom as the tools commanded by the control device(s). Position, force, and tactile feedback sensors may be employed to transmit position, force, and tactile sensations associated with the tools 14, 15 back to the operator O through the control devices 36.

As discussed above, vibrations may negatively affect control in various types of robotic systems, including non-medical and medical robotic systems. In various robotic systems, joints are controlled by control loops, which may compare the commanded joint position with position feedback (e.g., from position sensors such as joint encoders), and use the difference to generate a control force (e.g. linear force, rotary force such as torque, etc.) In high-performance and high-precision applications (e.g., in some medical robotics applications), the position loops are generally of high bandwidth to decrease response time to operator commands. In some embodiments where the links of a robotic system are more compliant, the resonant frequencies of the system can often be much lower than the control system bandwidth, and vibrations at or near resonance are more likely to interfere with the intended robotic motions. In some embodiments where the links and joints of a robotic system are more rigid, the resonant frequencies of the system are generally much higher than the control system bandwidth, and vibrations at or near resonance do not interfere with the intended robotic motions.

The stiffness of a robotic link for a particular robotic system may be limited by design constraints such as the size and weight considerations. As such, faster motions of the joints may excite structural vibration modes that take a longer amount of time to settle, even after the encoder-measured joint positions reach their commanded values. Applying standard position control to such a system, based purely on the encoder position, may lead to issues related to: the encoders cannot measure downstream structural vibrations, and standard control designs do not estimate structural vibrations or apply a control force that cancels the vibrations. Thus, the standard position control system may attempt to force the error between commanded and encoder-measured joint position to zero, even if such attempt leads to increased structural vibrations. Such vibrations experienced on the manipulator or a tool supported by the manipulator may cause control problems. For example, such vibrations experienced on a tip of a tool may cause control problems that increase the time to complete the procedure, increase the error rate in the procedure, result in less accurate movements, etc. As a specific example, such vibrations may make it difficult in a medical application for the robotic system to perform the desired or commanded tool movements, imaging or scanning or workspaces, manipulations of tissue, needles, and sutures, etc.

Referring to FIGS. 3-9, as discussed in detail below, various vibration cancellation techniques may be used to reduce vibrations in a robotic system. A control system may control the robotic arm assembly such that those vibrations are reduced (e.g. smaller vibration amplitudes, faster settling times, etc.). In an example, passive mechanical components (e.g., dampers or dynamic absorbers) may be used to dissipate the energy of the vibrations. In another example, active components such as a motor (e.g. electric motors, solenoids, etc.) may be used to inject opposing forces (rotary torques and/or linear forces) to cancel the vibrations partially or entirely.

In various embodiments, the vibration cancellation techniques may include active vibration cancellation. Such active vibration cancellation may include using a point (also referred to as a control point) referenced to a feature of interest (e.g., a most distal link of a manipulator of a robotic system). The control point may be, for example, defined to be at the location of a sensor system located on a link of a manipulator, at a location that avoids one or more mathematical singular configurations of the manipulator, etc. In addition, the control point need not coincide with the physical extent of a component, and may be located outside the physical extent of the component (e.g. the link), for example. Furthermore, the velocity of the control point may be determined based on sensor measurement data (e.g., acceleration data from an accelerometer of the sensor system) and/or angular velocity of the link (e.g., determined based on encoder measurements and assumed rigid body dynamics, or measured by an inertial sensor such as a gyroscope of the sensor system). The control point velocity is used in some embodiments to estimate the actual position of the control point. A control point position error may be determined based on the difference between the commanded position of the control point (which can be calculated by forward kinematics from the commanded joint positions) and the actual position of the control point. The control point velocity and position error may be mapped to the joints via inverse kinematics to determine the joint velocities and joint position errors, which may them be used to determine one or more vibration cancellation forces to be applied to one or more joints of the manipulator of the robotic system. In some embodiments, the vibration cancellation forces are only determined based on the control point velocity estimate, and as such, control point position estimate is not used. In such embodiments, only a single integration based on the control point velocity estimate is needed, which is simpler than the embodiments where the vibration cancellation forces are determined based on both the control point velocity estimate and the control point position estimate.

In various embodiments, by using such active vibration cancellation, the same motors commanded to follow encoder position commands may be used to cancel vibration, and reduce or eliminate the need for actuators or drive trains dedicated to vibration cancellation. In those embodiments, the vibration cancellation force may be zero, e.g., when the joint encoder tracking error is large or when the position command from the operator is changing. This may be achieved by performing a "dynamic saturation" technique, which applies the vibration cancellation force in the controller of one or more joints based on the corresponding vibration cancellation state for the joint.

In some embodiments, a vibration cancellation state indicates enablement of vibration cancellation: (1) by being a state affirmatively associated with enabling vibration cancellation, such as by being an affirmative vibration cancellation enabling state, or (2) by not being a state affirmatively disabling vibration cancellation, such as by not being an affirmative vibration cancellation disabling state. In some embodiments, the vibration cancellation state indicates disablement of vibration cancellation: (1) by not being a state affirmatively associated with the enablement of the vibration cancellation, such as by not being an affirmative vibration cancellation enabling state, or (2) by being a state affirmatively associated with the vibration cancellation state, such as by being an affirmative vibration cancellation disabling state. A vibration cancellation enabling state is also called a "cancellation enabling state," and a vibration cancellation disabling state is also called a "cancellation disabling state."

In an example, a variable or flag is set to affirmatively indicate the enablement of vibration cancellation (an affirmative cancellation enabling state), and the variable or flag not being set indicates the disablement of vibration cancellation. In another example, a variable or flag is set to affirmatively indicate the enablement of vibration cancellation (an affirmative cancellation enabling state), and the variable or flag not being set indicates the disablement of vibration cancellation. In yet another example, a variable or a flag is set to affirmatively indicate enablement of vibration cancellation (an affirmative cancellation enabling state), and the variable or flag is set differently (or a different variable or a different flag is set) to affirmatively indicate the disablement of vibration cancellation (an affirmative cancellation disabling state).

In some embodiments, the vibration cancellation state may include either a vibration cancellation enabling state (also referred to as a cancellation enabling state) or a vibration cancellation disabling state (also referred to as a cancellation disabling state). The cancellation enabling state indicates the enablement of the vibration cancellation. The cancellation disabling state does not indicate the enablement of the vibration cancellation.

In some embodiments, the vibration cancellation state indicating the enablement of the vibration cancellation includes the vibration cancellation state being a cancellation enabling state or the vibration cancellation state not being a cancellation disabling state.

In various embodiments, the vibration cancellation states for the joints may be determined based one or more cancellation conditions for one or more joints of the manipulator. The cancellation conditions may include various command tracking conditions, including for example, a commanded joint position condition determining that the commanded joint position has not reached a steady value, and an actual joint position condition determining that one or more joint positions (e.g., based on the corresponding encoder positions) are not close to the commanded joint positions.

In some embodiments, a joint's vibration cancellation state may be determined based on one or more cancellation conditions of that same joint, and not based on any cancellation conditions of any other joint. In an example, a joint may have a vibration cancellation enabling state if all cancellation conditions of that same joint are met; further, that same joint may have a vibration cancellation disabling state if one or more cancellation conditions of that same joint is not met.

In some embodiments, a joint's vibration cancellation state may be determined based on one or more cancellation conditions of another joint (e.g., another joint of the same manipulator, another joint of another manipulator of the same manipulator assembly), or of one or more joints in a group (e.g., all joints of a manipulator, all joints of all manipulators of a manipulator assembly, a subset of joints of a manipulator, or a subset of joints of a manipulator assembly). In an example, if any condition of one or more cancellation conditions of a joint in the group is not met, then each joint of a defined group of joints has a vibration cancellation disabling state. In that example, a joint has a vibration cancellation enabling state when all cancellation conditions are met for every joint in all joints of the group.

Vibration cancellation may not be applied to a joint with a vibration cancellation disabling state, and may be applied to a joint with a vibration cancellation enabling state. In some embodiments, the vibration cancellation force is not applied to the corresponding joint if the joint has a vibration cancellation disabling state. This can be achieved by not applying the vibration cancellation force at all, by setting the vibration cancellation force to zero, etc. in response to the vibration cancellation disabling state. In alternative embodiments, in response to a vibration cancellation disabling state, the vibration cancellation controller may not generate any vibration cancellation force or output a vibration cancellation force that is zero. In yet other embodiments, the cancellation force applied to a joint can be made to continuously transition from a non-zero to zero value when the vibration cancellation state transitions from enabled to disabled, and vice versa. Continuous transition of the applied force, such as through a gradual change over time, can help reduce abrupt motions of the joint (and associated manipulator or manipulator assembly), and help reduce the failing of motion or force based system checks.

Figure 3:
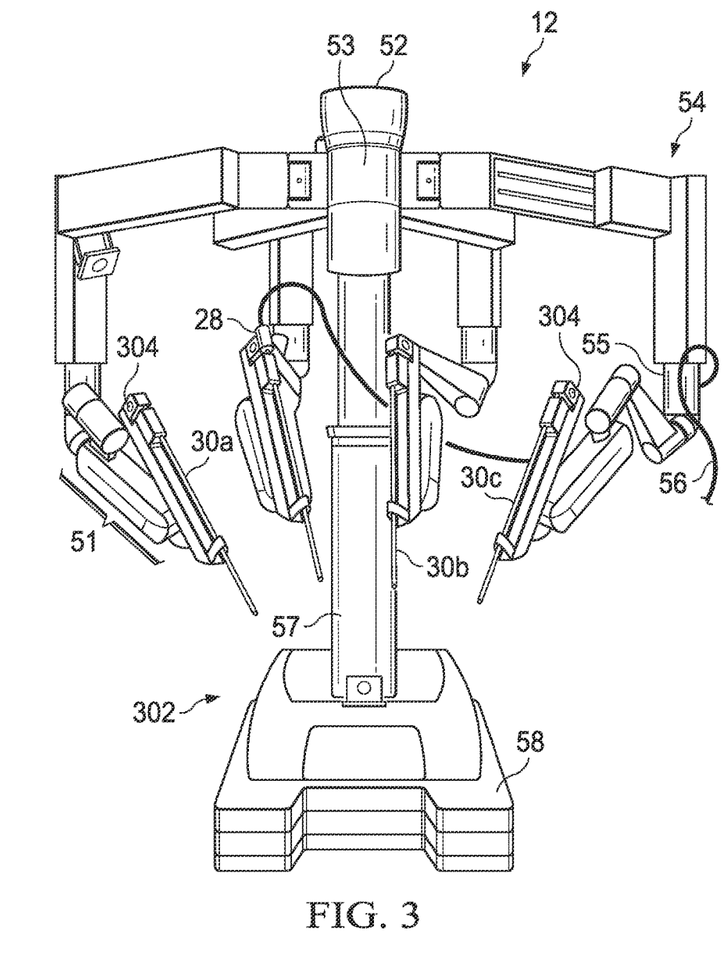
FIG. 3 is a perspective view of a manipulator assembly, in accordance with an embodiment of the present disclosure.

Referring to FIG. 3, illustrated is a perspective view of one embodiment of a manipulator assembly 12 (e.g., configured in the form of a cart that is located near the body B during a procedure). The manipulator assembly 12 shown provides for the manipulation of three tools 30a, 30b, 30c (e.g., similar to tools 14) and another tool 28 including an image sensor (e.g., similar to tool 15) used for the capture of images of the workpiece or of the site of the procedure (also called "work site"). The tool 28 may transmit signals over a cable 56 to the control system 20. Manipulation of the tools 30a, 30b, 30c, 28 is provided by robotic manipulators having a number of joints. The tool 28 and the tools 30a-c can be positioned and manipulated through openings in the body. The robotic manipulators and the tools 28, 30a-c can be manipulated such that a kinematic remote center is maintained, each robotic manipulator or tool is pivoted about its associated remote center during operations. In some embodiment, the kinematic remote center is maintained at an opening. In alternative embodiments, the kinematic remote center is maintained at a point other than the opening. For example, when an external access port is used to facilitate entry of the tool into the body, the remote center of motion may be outside the body at the entry into the access port, or somewhere in between the access port entry and an incision in the body. Images of the work site can include images of the tools 30a-c when they are positioned within the field-of-view of the image sensor of the tool 28. In a medical example, the body may be the body of a patient.

The manipulator assembly 12 includes a movable, lockable, and drivable base 58. The base 58 is connected to a column 57 that can be telescoped, which allows for adjustment of the height of the manipulator arms 54. The manipulator arms 54 may include a rotating joint 55 that both rotates and translates parallel to the column 57. The manipulator arms 54 may be connected to a platform 53 that is rotatable. The manipulator assembly 12 may also include a telescoping horizontal cantilever 52 for moving the platform 53 in a horizontal direction.

In the present example, each of the manipulator arms 54 includes a manipulator 51. The manipulator 51 may connect directly to a tool 14, and may or may not be teleoperable.

Image sensors (e.g., that of tool 15) may be provided in a variety of configurations, including ones having structures that are rigid, bendable or extendable at certain sections, or flexible. Optical image sensors may include a relay lens or optical fiber system for transmitting an image from a distal end to a proximal end of the tool comprising the image sensor. Digital-image based optical image sensors may use a distal digital sensor such as a one or more charge-coupled device (CCD) or a complementary metal oxide semiconductor (CMOS) device. Image sensors may also utilize other imaging techniques such as ultrasonic, infrared, hyperspectral, and fluoroscopic technologies. Image sensors may provide two- or three-dimensional images. Two-dimensional images may provide limited depth perception. Examples of medical image sensors include endoscope, ultrasound scopes, etc.

In various embodiments, the manipulator assembly 12 may be configured in the form of a cart, or be mounted to a table, a ceiling, a wall, a floor, etc. In various embodiments, a manipulator assembly 12 may comprise multiple manipulator arms as shown in FIG. 3, or comprise a single manipulator arm as shown in FIG. 4, as described in more detail below.

In the example of FIG. 3, one or more sensors 304 of a sensor system 302 are attached to one or more locations (e.g., on a distal-most link/last link of a manipulator connecting to a tool) of the manipulator assembly 12. The sensors 304 of the sensor system 302 are sensors different from the motor-side sensors (e.g., joint encoders). As such, the sensor system 302 is also referred to as a load side sensor system 302 including load side sensors 304 located at load side locations (e.g., locations on the one or more links), which are different from a motor-side sensor system including motor-side sensors. In some embodiments, one or more sensors 304 of a sensor system 302 may be integrated into the manipulator assembly 12. Such a load side sensor system may provide to the control system (e.g. the control system 20 of the example of FIG. 1) measurement data of the load side location, including, for example, the position and/or motion (e.g., linear velocity, linear acceleration, angular velocity) of the load side location. The control system may use the load side measurement data to control the robotic arm assembly to reduce tip vibration and settling time. It is noted that in some embodiments, the load side sensor system 302 may not physically located at the load side location. In an example, the load side location is indicated with a marker, and the load side sensor system 302 includes an image sensor system tracking track of the marker to provide the load side measurement data.

Figure 4:
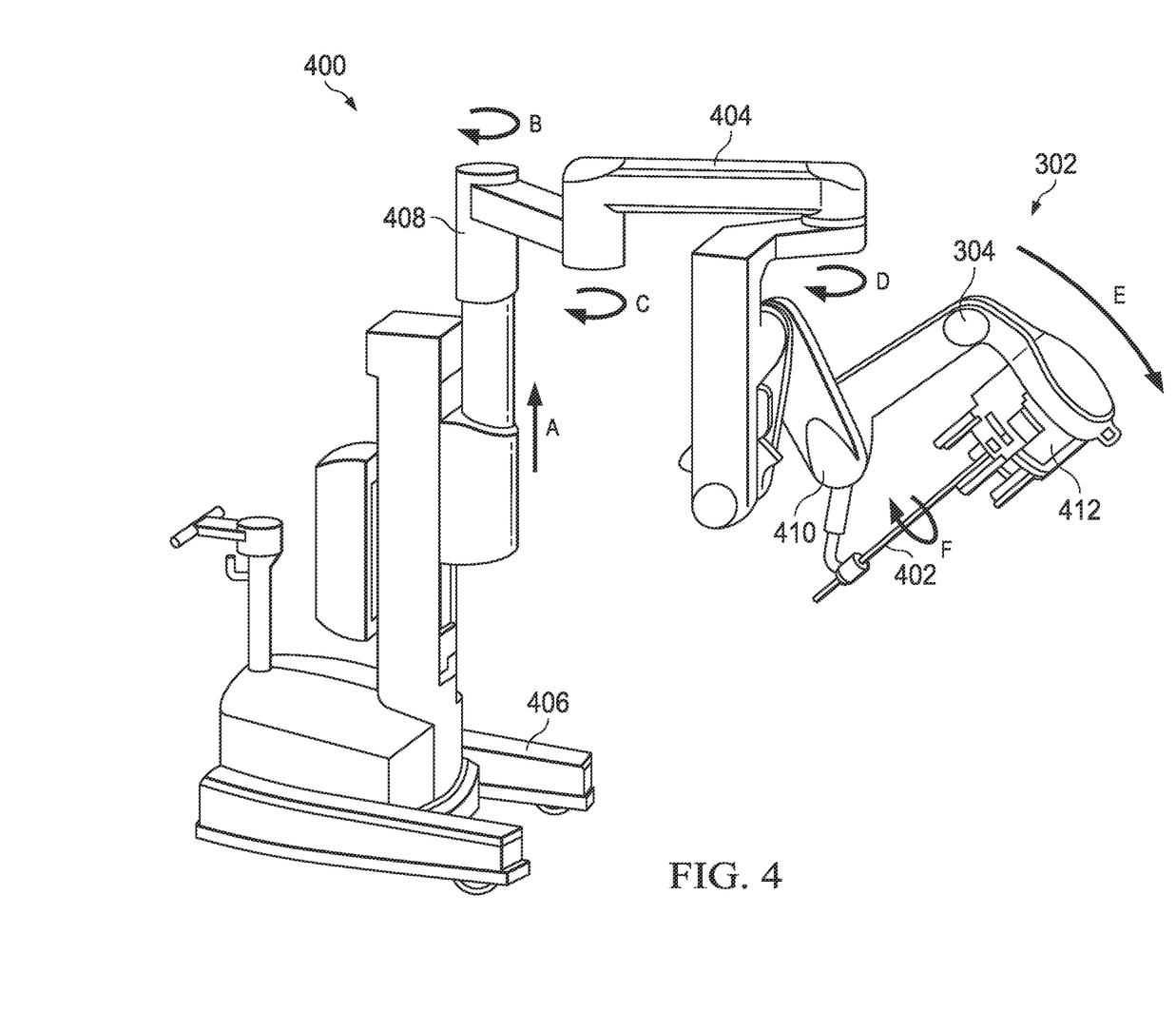
FIG. 4 is a perspective view of another manipulator assembly, in accordance with an embodiment of the present disclosure.

FIG. 4 illustrates, as an example, an alternative manipulator assembly 400 which is usable in a manipulator assembly 12 to introduce a plurality of articulated instruments to a work site through a single-entry aperture by an entry guide 402. In a medical example, the aperture may be a minimally invasive incision or a natural body orifice of a patient. The entry guide 402 is a cylindrical structure which is held and manipulated by a robot arm 404, which is mounted on base 406 and includes a setup arm 408 and an entry guide manipulator 410. The setup arm 408 comprises a plurality of links and joints which are used to position the entry guide 402 at the aperture. As indicated in the figure, the setup arm 408 includes a prismatic joint for adjusting the height of the setup arm 408 (as indicated by arrow "A") and a plurality of rotary joints for adjusting the horizontal position of the setup arm 408 (as indicated by arrows "B" and "C"). The entry guide manipulator 410 is used to robotically pivot the entry guide 402 (and the articulated instruments disposed within it at the time) in yaw, pitch and roll angular rotations about the pivot point as indicated by arrows D, E and F, respectively. Articulated instrument manipulators may reside in housing 412. One or more sensors 304 of a sensor system 302 may be located at a link of the entry guide manipulator 410.

Figure 5:
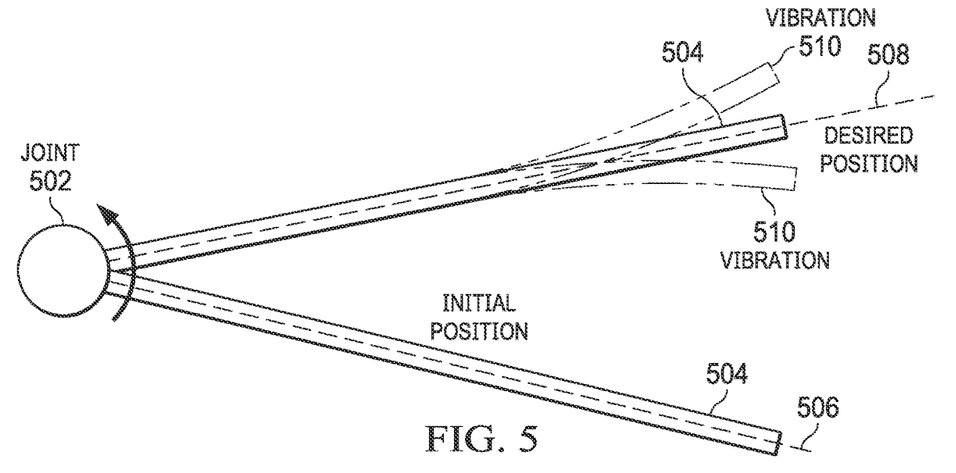
FIG. 5 illustrates a schematic view of a robotic system or a portion thereof in accordance with an embodiment of the present disclosure.

Referring to FIG. 5, an example of structural vibrations in a control system (e.g., control system 20) is illustrated. Illustrated in FIG. 5 is a portion of a manipulator including a joint 502 and a link 504 connected to the joint 502. The link 504 starts at an initial position 506. The control system 20 may receive an operator input indicating a desired position 508 (also referred to as a commanded position 508), and determine a force used to drive a motor for the joint 502 (e.g., based on a feedback joint position from the joint encoder) to move the link 504 from the initial position 506 to the desired position 508. However, fast motions of the joints may excite structural vibration modes 510, which may take a long time to settle even after the encoder-measured joint position reaches the commanded position 508.

Figure 6:
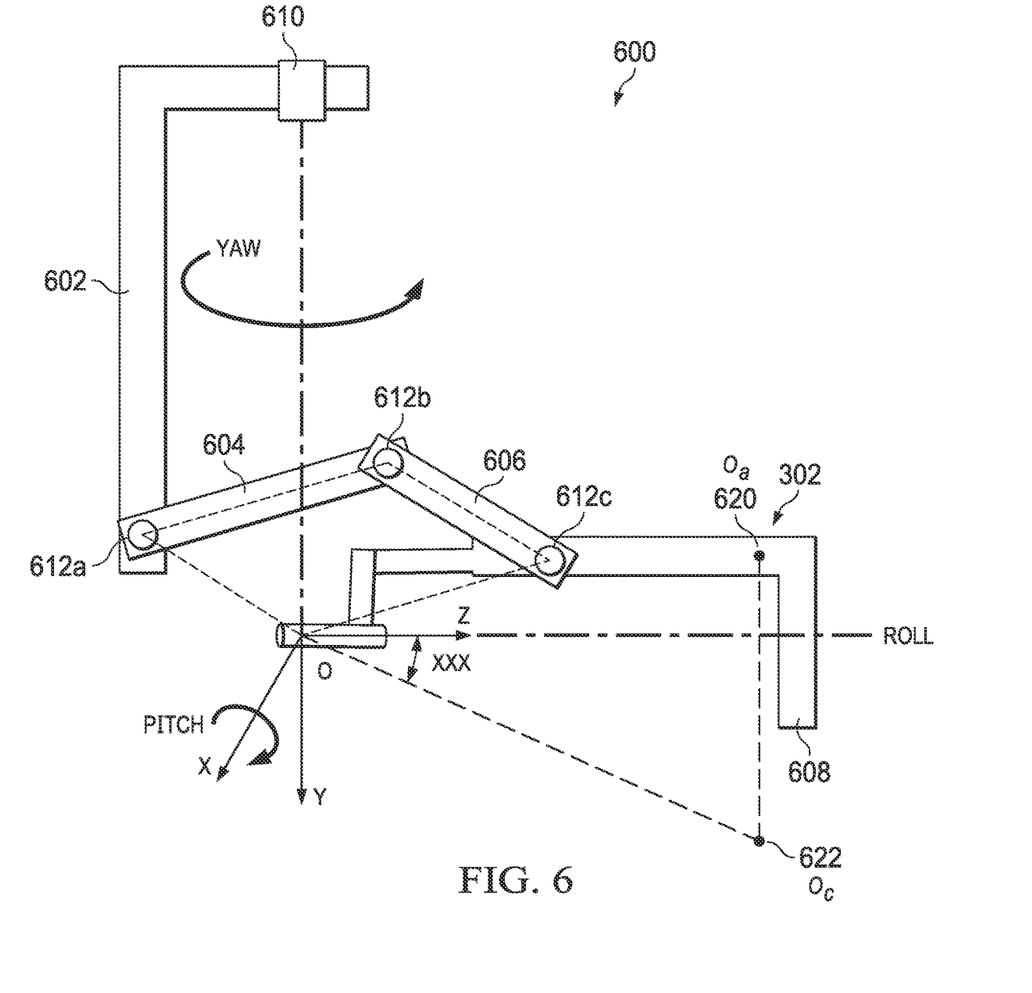
FIG. 6 illustrates a schematic view of a robotic system or a portion thereof in accordance with an embodiment of the present disclosure.

Referring to the example of FIG. 6, illustrated therein is a schematic view of a portion of a manipulator 600 of a robotic system (e.g., robotic system 12 of FIG. 3 or robotic system 400 of FIG. 4). The manipulator 600 includes links 602, 604, 606, and 608 and joints including, for example, joints 610, 612a, 612b, and 612c. The link 608 may be coupled to a tool, and referred to as a last link 608 or a distal-most link 608. A load side sensor system 302 may be located at a load side location 620 of the last link 608, and provide load side measurement data of that load side location 620. To simplify the description herein and in the claims, the term "joint" is to be understood to include the joint drive train.

As shown in the example of FIG. 6, a control point $O_c$ 622 is determined. In various embodiments, the control point may be selected, for example, at the location of a sensor system on the link, or at a point that avoids any singular configurations (e.g., located outside the physical extent of the link). In some embodiments, the control system 20 controls the vibrations at the abstracted point $O_c$ 622 rigidly connected to the link 608. The load side measurement data from the sensor system 302 at a load side location $O_a$ 620 is used to estimate velocity of the control point $O_c$ notionally attached to the link 608. In some embodiments, the control point velocity is fed back (e.g., based on kinematic calculations) to the control system 20, which applies corresponding vibration cancellation force to the motors (e.g., a yaw motor for a joint 610 and a pitch motor for a joint of 612a-612c) to cancel vibrations at control point $O_c$ 622. In some embodiments, most of the vibrations may come from links 604 and 606.

In this embodiment, the motors are under the control of the control system (e.g., the control system 20) and may be operated with motors of the other arms to take poses that may assist with advancing over a work piece (or a patient in a medical procedure), mounting of tools, preparation steps, or storage, among other activities. In addition, encoders and other sensors associated with each motor or joint provide feedback to the control system so that the control system receives data about, senses or detects, or determines the position, status, and setup of the manipulator 600. Although each of joints may be controlled by an individual joint controller, the joint controllers may be controlled by a common joint control unit of a common control system 20, so that the tool, the tip or end effector of the tool, and the manipulator may be controlled through operator (e.g., Operator O) manipulation of its associated control device (e.g., the operator input system for the example of FIGS. 1-2).

The load side sensor system 302 may include one or more sensors. Examples of sensors that may comprise the load side sensor system 302 include, for example, an inertial measurement unit (IMU), an accelerometer, a gyroscope, an electromagnetic sensor, a shape sensor, a torque sensor, an optical tracking system, an image tracking system, a hybrid sensor system, other suitable sensor systems, and a combination thereof. In some examples, the load side sensor system 302 may include an accelerometer configured to measure the linear acceleration of the load side location 620 and a gyroscope configured to measure the angular velocity of the load side location 620. In some embodiments, the load side sensor system 302 may include an accelerometer configured to measure the linear acceleration of the load side location 620, but does not include a gyroscope configured to measure the angular velocity of the load side location 620. In various embodiments, the location of the load side sensor system 302 may be determined based on various requirements of the system.

Figure 7:
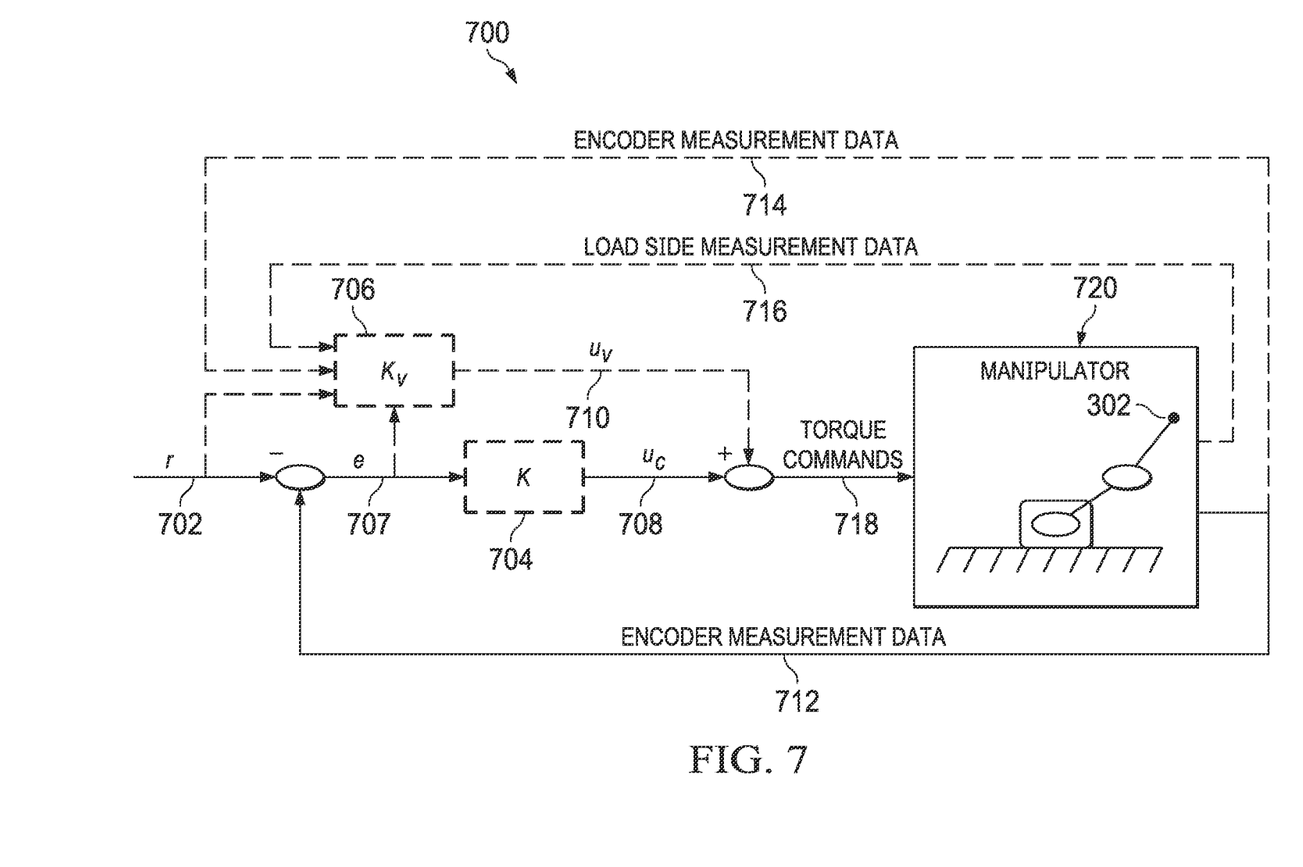
FIG. 7 illustrates a block diagram of a control system of a robotic system in accordance with an embodiment of the present disclosure.

Referring to FIG. 7, illustrated therein is an example of a control system 700 (e.g., control system 20 for the example of FIG. 1) for controlling a manipulator 720 (e.g., manipulator 600 of FIG. 6) of a robotic system. The control system 700 may include a joint controller 704 to control the joints based on operator commands, and a vibration controller 706 to control the joints for vibration cancellation. The control system 700 may be used to control movement of the manipulator 720, and consequently, the pose and motion of its attached tool and/or end effector, as commanded by movement of an operator input system (e.g. operator input system 16 for the example of FIGS. 1-2) by an operator O. Specifically, the control system 700 may receive a command 702 (also denoted as command r) as the operator O moves the operator input system during performing an operation (e.g., a surgical procedure). The command 702 may include a command joint position, a commanded joint motion, and/or a combination thereof. The control system 700 receives encoder measurement data 712 from the encoders of the manipulator 720, and generates a tracking error 707 (also referred to as a tracking error e) by computing a difference between the commanded joint position or velocity provided by the command 702 and the measured joint position or velocity based on encoder measurement data 712.

In some embodiments, the joint controller 704 may receive the tracking error 707, and generates a first control force 708 to control joints of the manipulator 720 to minimize the tracking error 707. A control force may include, for example, a rotary force (also called a "torque"), a linear force, or a combination of rotary and linear force components, based on the corresponding type of the joint, drive train, and/or motor. In some examples, the first control force 708 may be used to drive joints of the manipulator 720 until the tracking error 707 zero out. In some embodiments, joints may be moved in response to the input from the operator by controlling the actuation assembly for the joints (e.g., using the first control force 708).

In some embodiments, the vibration controller 706 may receive both motor side measurement data 712 (e.g., from the encoders of the manipulator 720) and the load side measurement data 716 (e.g., from the load side sensor system 302 of the manipulator 720). The vibration controller 706 may further receive the command 702 and the tracking error 707, and generate a second control force 710 (may also referred to as a vibration cancellation force 710 or a cancellation force 710) to control the joints of the manipulator 720 for vibration cancellation based on the command 702, the tracking error 707, the encoder measurement data 714, and the load side measurement data 716. In some embodiments, the second control force 710 may be used to drive joints of the manipulator 720 for vibration cancellation. In some embodiments, the second control force 710 may be applied to the joints by controlling the actuation assembly.

While in some embodiments the first control force 708 and the second control force 710 may be applied to the joints respectively, in embodiments as illustrated in FIG. 7, The control system 20 may generate commands 718 (e.g., a torque command or a linear force command) by combining the first control force 708 and the second control force 710, and apply the commands 718 to the corresponding joint motors to control the joints of the manipulator 720. The commands 718 may be applied to control movement of the joints of the manipulator 720, and/or any one or more of several drivable mechanical elements for manipulating a tool wrist or end effector mechanism.

Figure 8:
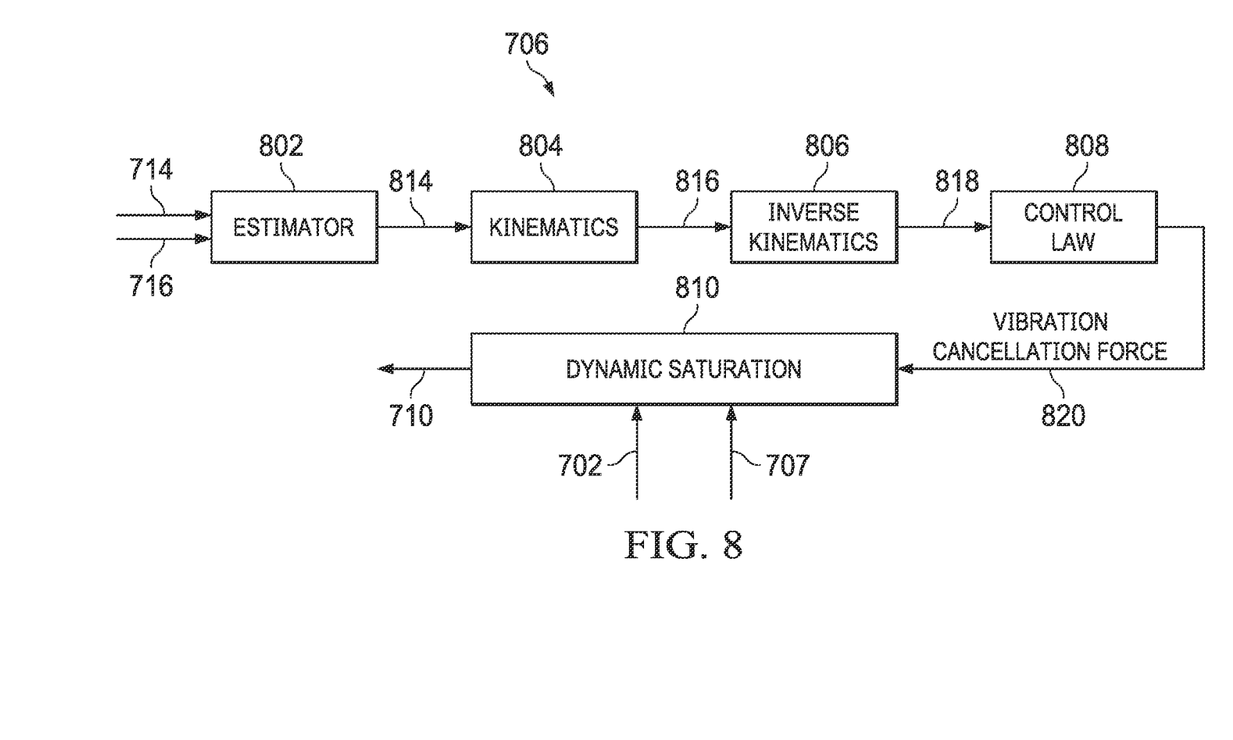
FIG. 8 illustrates a block diagram of a vibration controller of a control system of FIG. 7 in accordance with an embodiment of the present disclosure.

Referring to FIG. 8, illustrated therein as an example is a block diagram of a vibration controller 706 (e.g., vibration controller 706 of FIG. 7). The vibration controller 706 may include an estimator unit 802. The estimator unit 802 may receive encoder measurement data 714 and load side measurement data 716 from the load side sensor system 302, and generate a velocity estimate 814 of the load side location 620 in a world frame (also referred to as an absolute frame). In an example, the estimator unit 802 applies a set of high-pass filters to acceleration measurement data from an accelerometer of load side sensor system 302 to reject accelerometer bias, and then applies integration to convert acceleration to velocity. In this example, the velocity estimate 814 of the load side location 620 is not generated using the encoder measurement data 714. In another example, the estimator unit 802 applies a sensor fusion algorithm (e.g., Kalman filter) to both encoder measurement data 714 and load side measurement data 716 to and generate the velocity estimate 814 of the load side location 620.

In some embodiments, a kinematics unit 804 receives the velocity estimate 814 of the load side location 620, and converts the velocity estimate 814 of the load side location 620 to a velocity estimate of the control point 622. In various embodiments, physical constraints may make it impossible to place the load side sensor system 302 at the exact point (e.g., the control point 622) where vibrations are controlled. The kinematics unit 804 performs a kinematic calculation to convert the velocity estimate 814 of the load side location 620 to a velocity estimate of the control point 622. In an example, the control point 622 is chosen such that it is rigidly connected to the load side location 620.

In some embodiments, to compute the velocity of a point (e.g., control point 622) on a rigid body, the velocity at another point (e.g., the load side location 620) and the angular velocity of the rigid body are both used. In those embodiments, the load side sensor system 302 may include an accelerometer configured to measure the linear acceleration of the load side location 620 and a gyroscope configured to measure the angular velocity of the load side location 620. In those embodiments, the kinematics unit 804 may compute the velocity estimate 816 of the control point 622 based on the velocity estimate 814 of the load side location 620 and the angular velocity of the load side location 620, which is the angular velocity of the rigid body.

In some embodiments, the load side sensor system 302 may include an accelerometer configured to measure the linear acceleration of the load side location 620, but does not include a gyroscope or other angular velocity sensor configured to measure the angular velocity of the load side location 620. In those embodiments, the kinematics unit 804 may use rigid body kinematics based on the encoder measurement data 714 from the encoders to estimate the angular velocity of the rigid body. In some examples, there may be joints between the load side location 620 and the control point 622. In those examples, if vibrations in the distal links themselves may be neglected, rigid body kinematics may still be used to estimate the velocity of the control point 622.

In some embodiments, an inverse kinematics unit 806 may receive the velocity estimate 816 of the control point 622, and use inverse velocity kinematics (e.g., using the pseudoinverse of the Jacobian) to estimate joint velocities for achieving the desired velocity of the control point 622 for vibration cancellation. In various embodiments, some or all of the joints may be used. In an example, a subset of three joints may be used to effectively cancel vibrations at a single point to within an acceptable tolerance. In another example of manipulator 600 as shown in FIG. 6, a subset of two joints (e.g., a yaw joint and a pitch joint) may be used for effective vibration cancellation to within an acceptable tolerance.

In some embodiments, a control law unit 808 receives the estimated joint velocities for vibration cancellation, and computes an intermediate vibration cancellation force 820 (e.g., a torque signal per revolute joint or a linear force signal per prismatic joint) for cancelling the measured control point velocity 818. In an example, the control law unit 808 may apply a negative gain (i.e., direct velocity feedback) with a low-pass filter to filter out noise.

The vibration controller 706 includes a dynamic saturation unit 810 for handling command tracking and control system linearity. Regarding command tracking, in various embodiments, the same joints for tracking encoder position commands are used for vibration cancellation. As such, to cancel velocities at the control point for vibration, a dynamic saturation unit 810 may be used to reduce the likelihood of the vibration controller 706 inadvertently cancelling out desired or commanded motions (e.g., from operator commands). Thus, in some embodiments, the dynamic saturation unit 810 is used to help ensure that when the joint controller 704 is actively engaged in following a command from an operator, the vibration controller 706 does not actively perform vibration cancellation. Cancellation conditions addressing the command tracking issue are also referred to as command tracking conditions. In an example, vibration cancellation may be enabled if command tracking conditions are met, and may be disabled if command tracking conditions are not met.

Regarding control system linearity, it is noted that for small errors between joint commands and measured positions, a proportional-derivative (PD) joint controller (e.g., joint controller 704 of FIG. 7) effectively acts as a spring-damper system within the robotic system. In some embodiments, the vibrations cancelled at the command of the control system (e.g., control system 700 of FIG. 7) described here result not from purely structural oscillations, but rather the net effect of the structure and the command of a joint controller interfacing with that structure. Thus, in some of those embodiments, the system is configured so that the vibration controller 706 does not generate any force, or the forces generated by the vibration controller 706 are partially or entirely discarded, if the control system is not in the linear region operation. In an example when the control system is not operating in the linear region, the joint controller 704 has a saturated output (e.g., an output limited by the physical or electrical properties of the actuators of an actuator assembly for the corresponding joints). Various techniques may be used to determine whether the control system operates in the linear region (e.g., joint controller 704 having a saturated output), including for example, determining whether the encoder positions are far from the commanded values, determining whether the encoder velocities are not far from the commanded values, determining whether the net torque commanded by the joint controller exceeds a limit, or a combination of these conditions. Cancellation conditions addressing system linearity are also referred to as linearity conditions. A linearity condition is met for some system designs, for example, when one or a combination of the following are true: the positions of joints or links are within a threshold of commanded values, the velocities of joints or links are in the same direction and within a threshold magnitude of commanded values, the net torque, position, or velocity commanded by the joint controller is within a limit, etc. Joint or link position, velocity, and the like can be determined from encoder data, accelerometer data, or other sensor data. In some embodiments, vibration cancellation may be enabled if the linearity conditions are met, and may be disabled if the linearity conditions are not met. This type of implementation of vibration cancellation, where the vibration controller output is selectively discarded based on the state of the control system including e.g., the state of joint controller, can reduce the likelihood of sustained oscillations or control system instability.

To address these issues, in various embodiments, the dynamic saturation unit 810 may take as inputs the command (e.g., for each joint) 702 and tracking error 707, and modulate a dynamic vibration cancellation force limit on the vibration cancellation forces accordingly. In various embodiments, for each joint of one or more joints, the dynamic saturation unit 810 may provide a final vibration cancellation force 710 (e.g., the second control force 710 of FIG. 7) with a zero value after determining that that joint has a vibration cancellation disabling state, which is a vibration cancellation state indicating that vibration cancellation is disabled for the joint. If it is determined that a joint has a vibration cancellation enabling state, which is a vibration cancellation state indicating that vibration cancellation is enabled for this joint, the dynamic saturation unit 810 may output the received intermediate vibration cancellation force 820 as a final vibration cancellation force 710, effectively enabling vibration cancellation for that joint.

The one or more cancellation conditions may include a command tracking condition addressing the command tracking issue, a linearity condition addressing the system linearity issue, any other suitable cancellation condition, and/or a combination thereof. In some embodiments, for a joint, the command tracking condition is met based on an estimated or measured velocity of the joint, a commanded joint velocity of the first joint, and/or a commanded joint position of the first joint. In an example, a command tracking condition is met when a scalar magnitude of the commanded joint velocity of the joint is less than a corresponding determined threshold value. In some embodiments, the command velocity of a joint is computed by a numerical difference of command positions during a time period. In another example, a command tracking condition is met when a difference between the commanded joint position of the first joint and a previously commanded joint position of the first joint is less than a determined difference value.

In some embodiments, for a joint, the linearity condition is met when a tracking error (or a difference between the commanded joint position and a measured joint position) is less than a corresponding determined threshold value. In some examples, the threshold value for the linearity condition based on the tracking error may be determined based on a tracking error threshold indicating that the joint controller 704 is saturated. In those examples, when the joint controller 704 is saturated, vibration cancellation is disabled to help increase stability.

In various embodiments, the dynamic saturation unit 810 may use a dynamic vibration cancellation force limit, including for example, a dynamic vibration torque limit, and generate the final vibration cancellation force 710 with the smaller value of that vibration cancellation force limit and the vibration cancellation force 820. Specifically, when vibration cancellation is active (e.g., when it is determined that the one or more vibration cancellation condition have been met), the dynamic vibration cancellation torque limit is set to a higher torque limit. In this case, the final vibration cancellation force 710 has the smaller value of that higher torque limit and the vibration cancellation force 820. When vibration cancellation is inactive (e.g., when it is determined that the one or more vibration cancellation condition have not been met), the dynamic vibration cancellation torque limit is set to a lower torque limit (e.g., 0 Nm). In this case, the final vibration cancellation force 710 has the smaller value of that torque limit (e.g., 0 Nm) and the vibration cancellation force 820, effectively disabling vibration cancellation.

Figure 9:
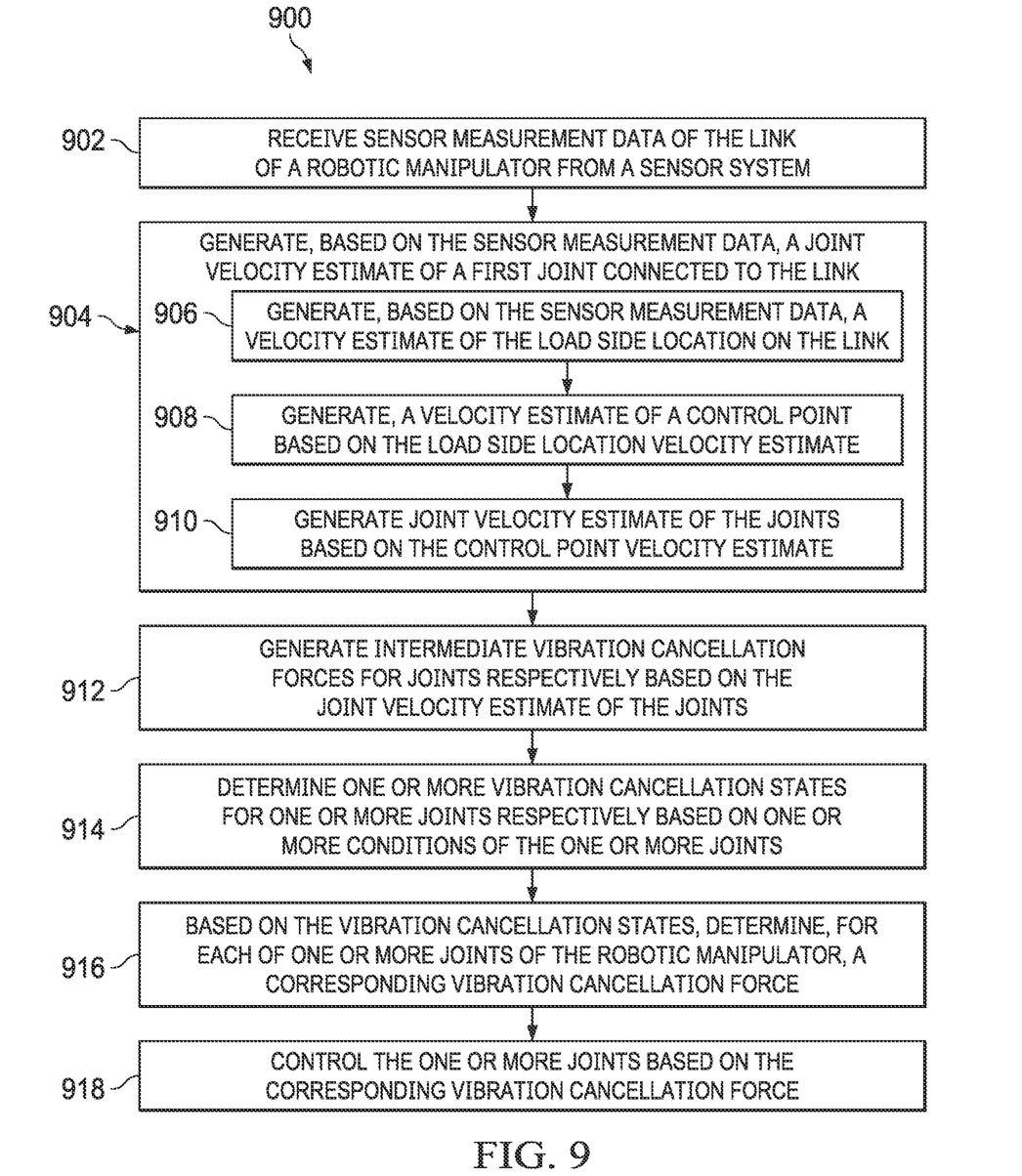
FIG. 9 is a flowchart providing a method for controlling a manipulator and an associated tool with vibration cancellation according to an embodiment of the present disclosure.

FIG. 9 illustrates a method 900 for active vibration cancellation for a manipulator based on load-side measurements with dynamic saturation. The method 900 is illustrated in FIG. 9 as a set of operations or processes 902 through 918. Not all of the illustrated processes 902 through 918 may be performed in all embodiments of method 900. Additionally, one or more processes that are not expressly illustrated in FIG. 9 may be included before, after, in between, or as part of the processes 902 through 918. In some embodiments, one or more of the processes may be implemented, at least in part, in the form of executable code stored on non-transitory, tangible, machine-readable media that when run by one or more processors (e.g., the processors of control system) may cause the one or more processors to perform one or more of the processes.

As shown in the method 900, a vibration controller of a control system may perform active vibration cancellation for a manipulator based on load side measurement data from load side sensors. In some embodiments, the load side sensors may be located at a load side location on links of the manipulator arm or other suitable load side locations. The vibration controller may include a dynamic saturation unit to modulate a vibration cancellation force based on a vibration cancellation condition determined based on one or more vibration cancellation condition. By utilizing the dynamic saturation unit, active vibration cancellation may be performed using the same joint motors for command tracking (e.g., controlling the manipulator based on operator commands). Further more, by utilizing the dynamic saturation unit, when a regular joint controller of the control system is saturated and enabling the vibration cancellation may cause instability, the vibration cancellation by the vibration controller may be disabled.

The method 900 begins at process 902, where a vibration controller of a control system may receive sensor measurement data of a load side location (e.g., on a link of a robotic manipulator) from a load side sensor system.

The method 900 may proceed to process 904, wherein the vibration controller (e.g., using an estimator unit 802, a kinematics unit 804, and an inverse kinematics unit 806 of a vibration controller 706) generates a joint velocity estimate of a first joint connected to the link based on the sensor measurement data. In some embodiments, the process 904 may include processes 906, 908, and 910. Specifically, in an example, at process 906, the estimator unit 802 may generate, based on the sensor measurement data, a velocity estimate of the load side location on the link. At process 908, the kinematics unit 804 generates a velocity estimate of a control point based on the load side location velocity estimate. At process 910, an inverse kinematics unit 806 generates the joint velocity estimate of one or more joints of the manipulator based on the control point velocity estimate.

The method 900 may proceed to process 912, wherein the vibration controller (e.g., using a control law unit 808) generates intermediate vibration cancellation forces for joints respectively based on the joint velocity estimate of the joints. In some embodiments, process 912 is not included, and the vibration controller may generate at process 916 vibration cancellation forces for joints respectively, after determining that the vibration cancellation state for the particular joint is an enabling vibration cancellation state.

The method 900 may proceed to process 914, wherein the vibration controller (e.g., using a dynamic saturation unit 810) determines vibration cancellation states for one or more joints based on one or more cancellation conditions of the joints including e.g., command tracking conditions addressing command tracking, saturation condition addressing joint controller saturation, and any other suitable cancellation conditions. The vibration cancellation state of a joint may be determined only based on its own cancellation condition, or be determined based, instead or in addition, on a cancellation condition of another joint, or of one or more joints in a group of joints (e.g., all joints in the same manipulator, a subset of joints in the same manipulator, all joints in another manipulator of the manipulator assembly, all joints of all manipulators of the manipulator assembly, etc.).

Any reference to surgical tools and surgical methods is non-limiting as the tools and methods described herein may be used for animals, human cadavers, animal cadavers, portions of human or animal anatomy, non-surgical diagnosis, industrial systems, and general robotic or teleoperational systems.

One or more elements in embodiments of the invention may be implemented in software to execute on a processor of a computer system such as control processing system. When implemented in software, the elements of the embodiments of the invention are essentially the code segments to perform the necessary tasks. The program or code segments can be stored in a processor-readable storage medium or device that may have been downloaded by way of a computer data signal embodied in a carrier wave over a transmission medium or a communication link. The processor readable storage device may include any medium that can store information including an optical medium, semiconductor medium, and magnetic medium. Processor readable storage device examples include an electronic circuit; a semiconductor device, a semiconductor memory device, a read-only memory (ROM), a flash memory, an erasable programmable read-only memory (EPROM); a floppy diskette, a CD-ROM, an optical disk, a hard disk, or other storage device. The code segments may be downloaded via computer networks such as the Internet, Intranet, etc.

Note that the processes and displays presented may not inherently be related to any particular computer or other apparatus. Various general-purpose systems may be used with programs in accordance with the teachings herein, or it may prove convenient to construct a more specialized apparatus to perform the operations described. In addition, the embodiments of the invention are not described with reference to any particular programming language. It will be appreciated that a variety of programming languages may be used to implement the teachings of the invention as described herein.

While certain exemplary embodiments of the invention have been described and shown in the accompanying drawings, it is to be understood that such embodiments are merely illustrative of and not restrictive on the broad invention, and that the embodiments of the invention not be limited to the specific constructions and arrangements shown and described, since various other modifications may occur to those ordinarily skilled in the art.

The invention claimed is:

1. A robotic system comprising:
   a robotic manipulator including a first joint and a link connected to the first joint; and
   a processing unit including one or more processors, the processing unit configured to:
      receive sensor measurement data of the link from a sensor system,
      generate, based on the sensor measurement data, a first joint velocity estimate of the first joint,
      determine a first vibration cancellation state for the first joint based on one or more cancellation conditions of one or more of joints of the robotic manipulator,
         wherein a first cancellation condition is determined based on whether a commanded joint position or velocity of a joint is within a range determined using a defined threshold, and
      in response to the first vibration cancellation state indicating enablement of vibration cancellation for the first joint, apply a first cancellation force to the first joint, the first cancellation force based on a first joint velocity estimate of the first joint.

2. The robotic system of claim 1, wherein each cancellation condition of the one or more cancellation conditions includes at least one condition selected from the group consisting of: a linearity condition and a command tracking condition.

3. The robotic system of claim 1, wherein the robotic manipulator comprises a plurality of joints, and wherein the processing unit is further configured to:
   for each joint of the plurality of joints, determine a vibration cancellation state for that joint and control that joint based on that vibration cancellation state.

4. The robotic system of claim 3, wherein, for each joint of the plurality of joints, determining the vibration cancellation state for that joint comprises:
   determining the vibration cancellation state as a cancellation enabling state in response to determining that a cancellation condition is met for each joint of a group of joints.

5. The robotic system of claim 4, the group of joints includes
   all joints of the plurality of joints; or
   one or more joints of a second robotic manipulator of the robotic system.

6. The robotic system of claim 3, wherein the processing unit is further configured to, for each joint of the plurality of joints:
   determine an initial vibration cancellation force;
   limit, in accordance with the vibration cancellation state, the initial vibration cancellation force to generate a limited cancellation force; and
   apply the limited cancellation force to the joint.

7. The robotic system of claim 1, wherein the one or more cancellation conditions comprise a cancellation condition determined based on:
   an estimated or measured velocity of a joint of the one or more joints, or
   a commanded joint velocity or a commanded joint position of the first joint.

8. The robotic system of claim 7, wherein the cancellation condition is determined based on the commanded joint velocity and the commanded joint position of the first joint.

9. The robotic system of claim 1, wherein the one or more cancellation conditions comprise a cancellation condition of a joint that is determined to be met in response to a first difference between a commanded joint position and a measured joint position being less than a first defined difference or in response to a second difference between the commanded joint position of the first joint and a previously commanded joint position of the first joint being less than a second defined difference.

10. The robotic system of claim 1, wherein the robotic manipulator is configured to physically support and move a tool; and
   wherein the processing unit is configured to:
      generate, based on the sensor measurement data, a control point velocity estimate of a control point associated with the tool,
      generate the joint velocity estimate of the first joint based on the control point velocity estimate, and
      set a location of the control point relative to the tool based on one or more mathematically singular configurations of the robotic manipulator.

11. A method of operating a robotic system comprising:
   receiving, with processing unit and from a sensor system, sensor measurement data of a link of a robotic manipulator of the robotic system, wherein the robotic manipulator includes a first joint connected to the link;
   generating, with the processing unit and based on the sensor measurement data, a first joint velocity estimate of the first joint;
   determining, with the processing unit, a first vibration cancellation state for the first joint based on one or more cancellation conditions of one or more of joints of the robotic manipulator,
      wherein a first cancellation condition is determined based on whether a commanded joint position or velocity of a joint is within a range determined using a defined threshold; and
   in response to the first vibration cancellation state indicating enablement of vibration cancellation for the first joint, applying, with the processing unit, a first cancellation force to the first joint, the first cancellation force based on a first joint velocity estimate of the first joint.

12. The method of claim 11, wherein each cancellation condition of the one or more cancellation conditions includes at least one condition selected from the group consisting of: a linearity condition and a command tracking condition.

13. The method of claim 11, wherein the robotic manipulator comprises a plurality of joints, further comprising:
   for each joint of the plurality of joints, determining a vibration cancellation state for that joint and control the joint based on that vibration cancellation state.

14. The method of claim 13, wherein, for each joint of the plurality of joints, determining the vibration cancellation state for that joint comprises:
   determining a cancellation enabling state in response to determining that a cancellation condition is met for each joint of a group of joints.

15. The method of claim 14, wherein the group of joints is a subset of the plurality of joints.

16. The method of claim 14, wherein the group of joints includes:
   all joints of the plurality of joints; or
   one or more joints of a second robotic manipulator of the robotic system.

17. The method of claim 13, further comprising:
   for each joint of the plurality of joints:
      determining an initial vibration cancellation force;
      limiting, in accordance with the vibration cancellation state, the initial vibration cancellation force to generate a limited cancellation force; and
      applying the limited cancellation force to the joint.

18. The method of claim 11, wherein the one or more cancellation conditions comprise:
   a cancellation condition determined based on an estimated or measured velocity of a joint of the one or more joints; or
   a cancellation condition determined based on a commanded joint velocity or a commanded joint position of the first joint; or
   a cancellation condition that is determined to be met in response to a determination that a magnitude of a commanded joint velocity of a joint of the one or more joints is less than a defined velocity value; or
   a cancellation condition of a joint that is determined to be met in response to a difference between a commanded joint position and a measured joint position being less than a defined difference; or
   a cancellation condition of a joint that is determined to be met based on a difference between a commanded joint position of the first joint and a previously commanded joint position of the first joint being is less than a determined difference value.

19. The method of claim 11, wherein the robotic manipulator is configured to physically support and move a tool, further comprising:
   generating, based on the sensor measurement data, a control point velocity estimate of a control point associated with the tool, and
   generating the joint velocity estimate of the first joint based on the control point velocity estimate; and
   setting a location of the control point relative to the tool based on one or more mathematically singular configurations of the robotic manipulator.

20. A non-transitory machine-readable medium comprising a plurality of machine-readable instructions which, when executed by one or more processors, are adapted to cause the one or more processors to perform a method comprising:
   receiving, from a sensor system, sensor measurement data of a link of a robotic manipulator of a robotic system, wherein the robotic manipulator includes a first joint connected to the link;
   generating, based on the sensor measurement data, a first joint velocity estimate of the first joint;
   determining, a first vibration cancellation state for the first joint based on one or more cancellation conditions of one or more of joints of the robotic manipulator,
      wherein a first cancellation condition is determined based on whether a commanded joint position or velocity of a joint is within a range determined using a defined threshold; and
   in response to the first vibration cancellation state indicating enablement of vibration cancellation for the first joint, applying a first cancellation force to the first joint, the first cancellation force based on a first joint velocity estimate of the first joint.

\* \* \* \* \*